United States Patent
Hsiung et al.

(10) Patent No.: US 7,963,494 B2
(45) Date of Patent: Jun. 21, 2011

(54) HOLDER, AND ASSEMBLY OF THE HOLDER AND AN ELECTRONIC DEVICE

(75) Inventors: Ta-Chun Hsiung, Taipei Hsien (TW); Chi-Chun Chiang, Taipei Hsien (TW); Ming-Tao Chang, Taipei Hsien (TW); Chu-Cheng Yang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 399 days.

(21) Appl. No.: 12/269,511

(22) Filed: Nov. 12, 2008

(65) Prior Publication Data

US 2009/0207558 A1    Aug. 20, 2009

(30) Foreign Application Priority Data

Feb. 15, 2008 (TW) ................................ 97202777 U

(51) Int. Cl.
 *A47G 1/10* (2006.01)
(52) U.S. Cl. .................................................... 248/316.7
(58) Field of Classification Search ............... 248/316.7, 248/309.1, 316.2, 316.3, 316.8, 316.1; 379/454; 439/164
 See application file for complete search history.

(56) References Cited

U.S. PATENT DOCUMENTS

| | | | | |
|---|---|---|---|---|
| 5,555,302 A | * | 9/1996 | Wang | 379/446 |
| 5,788,202 A | * | 8/1998 | Richter | 248/316.4 |
| 5,825,874 A | * | 10/1998 | Humphreys et al. | 379/446 |
| 5,836,563 A | * | 11/1998 | Hsin-Yung | 248/316.4 |
| 7,080,812 B2 | * | 7/2006 | Wadsworth et al. | 248/316.6 |
| 7,540,459 B2 | * | 6/2009 | Asano et al. | 248/309.1 |
| 7,828,259 B2 | * | 11/2010 | Wang et al. | 248/316.4 |
| 2002/0190176 A1 | * | 12/2002 | Louh | 248/316.4 |
| 2006/0231713 A1 | * | 10/2006 | Crain et al. | 248/309.1 |
| 2006/0278788 A1 | * | 12/2006 | Fan | 248/309.1 |
| 2009/0294617 A1 | * | 12/2009 | Stacey et al. | 248/316.1 |
| 2010/0315041 A1 | * | 12/2010 | Tan | 320/115 |

FOREIGN PATENT DOCUMENTS

TW    M312879    5/2007

OTHER PUBLICATIONS

English translation of abstract of TW publication M312879.

* cited by examiner

*Primary Examiner* — Ramon O Ramirez
(74) *Attorney, Agent, or Firm* — Kramer Levin Naftalis & Frankel LLP

(57) ABSTRACT

A holder is for holding an electronic device, and includes a housing, a support frame, and a resilient element. The housing is disposed on a rear face of the electronic device, defines a receiving space, and includes a barrier plate abutting against one side of the electronic device. The support frame is disposed in the receiving space and is movable relative to the housing. The support frame includes a catch member which is exposed from the housing, which is disposed opposite to the barrier plate, and which is engaged with a retaining hole in the rear face, and a push button portion exposed from the housing. The push button portion is operable to permit disengagement of the catch member from the retaining hole. The resilient element is disposed in the receiving space to provide the catch member with a restoring spring force.

22 Claims, 8 Drawing Sheets

HOLDER, AND ASSEMBLY OF THE HOLDER AND AN ELECTRONIC DEVICE

CROSS-REFERENCE TO RELATED APPLICATION

This application claims priority of Taiwanese Application No. 097202777, filed on Feb. 15, 2008.

BACKGROUND OF THE INVENTION

1. Field of the Invention

The invention relates to a holder for a portable electronic device, and to an assembly of the holder and the electronic device, more particularly to a holder that is assembled to a rear face of a portable electronic device, and to an assembly of the holder and the electronic device.

2. Description of the Related Art

Referring to FIGS. 1 and 2, a conventional holder 1 is used for holding a portable electronic device 2, such as a global positioning system (CPS), a cellular phone, a digital music player, or a personal digital assistant (PDA). The holder 1 includes a frame 11 and four clamping plates 12, 13, 14, 15 extending respectively from the frame 11 in the same direction. The clamping plate 12 at a top end of the frame 11 has an inner surface provided with a retaining block 121. The clamping plate 13 at a bottom end of the frame 11 has an inner surface provided with two retaining blocks 131 that are spaced apart from each other. The holder 1 can be assembled to a rear face of the electronic device 2 in a rear-to-front direction. With the retaining block 121 engaging a retaining hole 211 in a top face 21 of the electronic device 2 and the retaining blocks 131 engaging retaining holes 221 in a bottom face 22 of the electronic device 2, and with both of the clamping plates 14, 15 gripping left and right lateral faces 23 of the electronic device 2, the holder 1 can be attached to the electronic device 2.

However, during detachment of the electronic device 2 from the holder 1, the retaining blocks 121, 131 will rub against the top and bottom faces 21, 22 of the electronic device 2 while the clamping plates 14, 15 will rub against the two lateral faces 23 of the electronic device 2, thereby resulting in scratching of the top face 21, the bottom face 22, and the lateral faces 23 of the electronic device 2. The scratches impair the appearance of the electronic device 2. Furthermore, since the clamping plates 12, 13, 14, 15 respectively clamp the top face 21, the bottom face 22, and the lateral faces 23 of the electronic device 2, the appearance of the electronic device 2, when viewed from the front, will be adversely affected.

In addition, Taiwanese Utility Model No. M312879 (Application No. 95216564) discloses a support frame similar to the holder structure described above. The support frame includes a placement portion for placement of an electronic device thereon. The placement portion is attached to the electronic device using four clamping portions that clamp outer peripheral surfaces of the electronic device. However, the clamping portions likewise will rub against the outer peripheral surfaces of the electronic device during detachment of the electronic device from the support frame, thereby resulting in scratching of the electronic device. Moreover, the clamping portions gripping the electronic device will affect the overall appearance of the electronic device.

SUMMARY OF THE INVENTION

Therefore, an object of the present invention is to provide a holder that is adapted to hold an electronic device in a snap-fit manner so that the holder will not rub against peripheral surfaces of the electronic device during detachment of the electronic device therefrom.

An other object of the present invention is to provide an assembly of a holder and an electronic device that are assembled in a snap-fit manner so as to avoid rubbing between the holder and peripheral surfaces of the electronic device during disassembly.

Other objects and advantages of the present invention will become more apparent from the technical features disclosed herein.

In order to achieve one or a part or all of the aforesaid objects or other objects, the holder in an embodiment of this invention is disposed for holding an electronic device. The electronic device includes a rear face and a retaining hole provided in the rear face. The holder includes a housing, a support frame, and a resilient element.

The housing is disposed on the rear face of the electronic device. The housing defines a receiving space, and includes a barrier plate disposed to abut against one side of the electronic device. The support frame is disposed in the receiving space and is movable relative to the housing. The support frame includes a catch member which is exposed from the housing, which is disposed opposite to the barrier plate, and which is engaged with the retaining hole, and a push button portion exposed from the housing. The push button portion is pressible to move the catch member away from the retaining hole so as to release engagement between the catch member and the retaining hole. The resilient element is disposed in the receiving space to provide the catch member with a restoring spring force.

In an embodiment of this invention, the housing further includes a front plate connected to the barrier plate and disposed to abut against the rear face of the electronic device. The front plate has an opening disposed adjacent to a top end thereof. The retaining hole extends horizontally. The catch member extends through the opening and is engaged with the retaining hole.

In an embodiment of this invention, the electronic device further includes a positioning hole disposed in a bottom face thereof, and the barrier plate has a positioning member engaged with the positioning hole.

In an embodiment of this invention, the support frame further includes a generally upright frame body, and the catch member has an extension portion extending forwardly from a top end of the frame body and through the opening, and a hook portion formed at a front end of the extension portion and engaged with the retaining hole.

In an embodiment of this invention, the housing further includes a through hole formed in a bottom end thereof, and the push button portion is formed at a bottom end of the frame body and extends through the through hole.

In an embodiment of this invention, the electronic device further includes a first electrical connector disposed on the rear face. The holder further includes a circuit board disposed in the receiving space, and a second electrical connector disposed on the housing and electrically connected between the first electrical connector and the circuit board.

In an embodiment of this invention, the front plate further includes a first positioning hook disposed in the receiving space. The support frame further includes a second positioning hook disposed on the frame body and above the first positioning hook. The resilient element is a compression spring or a resilient plate having two ends that are respectively secured to the first and second positioning hooks.

Since the holder according to the embodiment of this invention is assembled to the electronic device by means of the positioning member and the catch member that are respectively engaged with the positioning hole and the retaining hole in the electronic device, the holder will not rub against outer peripheral surfaces of the electronic device during disassembly, thereby avoiding damage to the appearance of the electronic device. In addition, since the size of the holder is small, after the holder is assembled to the rear face of the electronic device, the electronic device can hide the holder from sight. Therefore, the holder will not affect the appearance of the electronic device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

It is particularly noted herein that directional terminologies, such as top, bottom, left, right, front and rear, as used herein are defined in relation to the drawings, and are intended to facilitate description of the present invention rather than limit the scope of the present invention.

Figure 3:
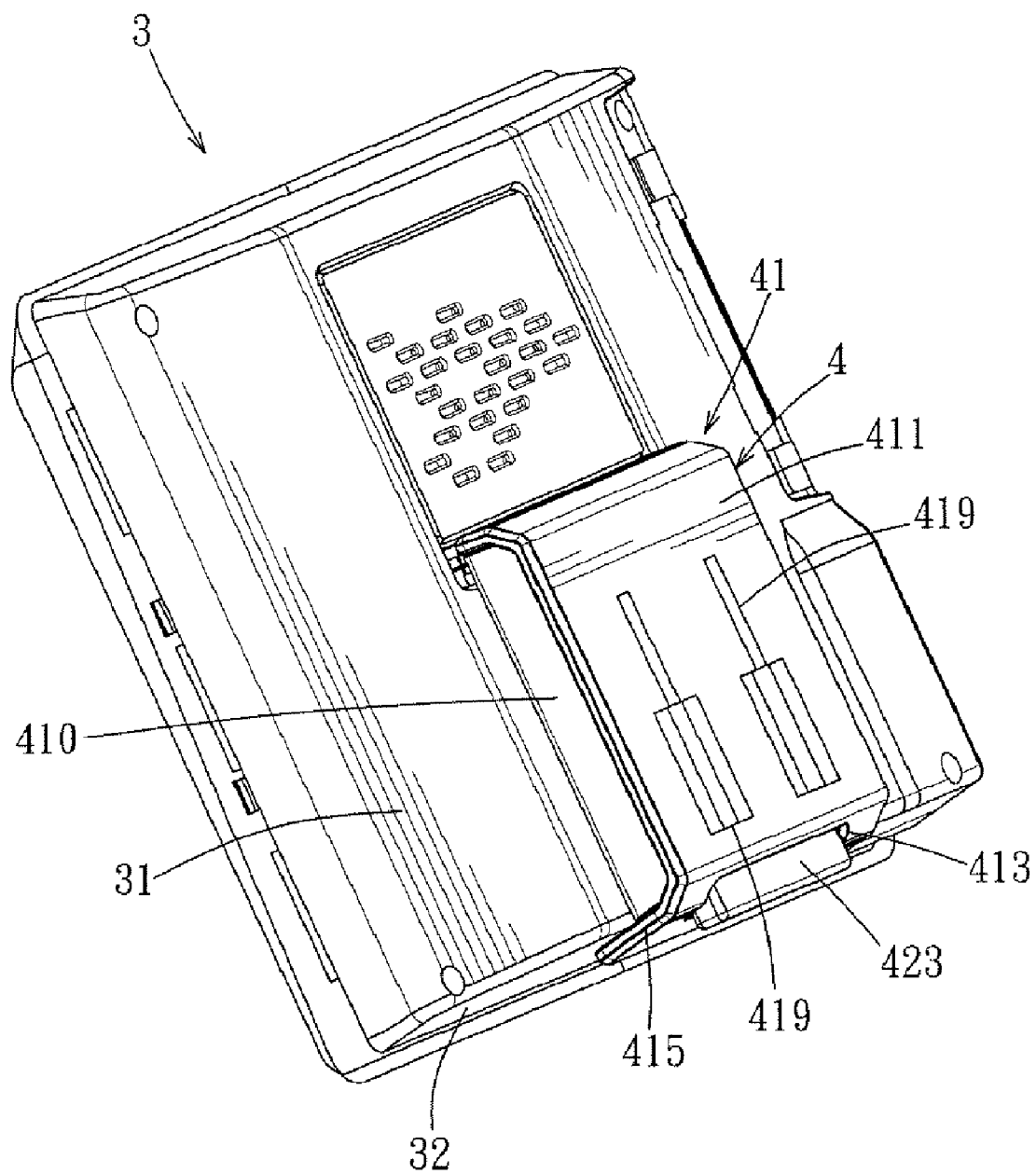
FIG. 3 is a perspective view of a preferred embodiment of an assembly of a holder and an electronic device according to the present invention.

FIG. 3 illustrates a preferred embodiment of an assembly of a holder 4 and an electronic device 3 according to the present invention. The holder 4 is disposed to be assembled to the electronic device 3. In this embodiments the electronic device 3 is a global positioning system, and the holder 4 may be mounted on a support seat (not shown) disposed in a vehicle such that the electronic device 3 may be mounted on the support seat through the arrangement of the holder 4. Certainly, the electronic device 3 may be a portable electronic device, such as a cellular phone, a digital music player or a personal digital assistant, and the holder 4 and the support seat may have applications in other scenarios.

As shown in FIGS. 3, 4, 5 and 6, the electronic device 3 includes a rear face 31, a bottom face 32 connected to a bottom end of the rear face 31, two retaining holes 33, and two positioning holes 34. The rear face 31 of the electronic device 3 has a middle portion that is formed with a transversely extending groove 311, and a surrounding wall 312 defining the groove 311. The two retaining holes 33 are provided in a horizontal wall portion 313 of the surrounding wall 312 and are spaced apart from each other such that the retaining holes 33 extend horizontally. The two positioning holes 34 are provided in the bottom face 32 and are spaced apart from each other.

Figure 4:
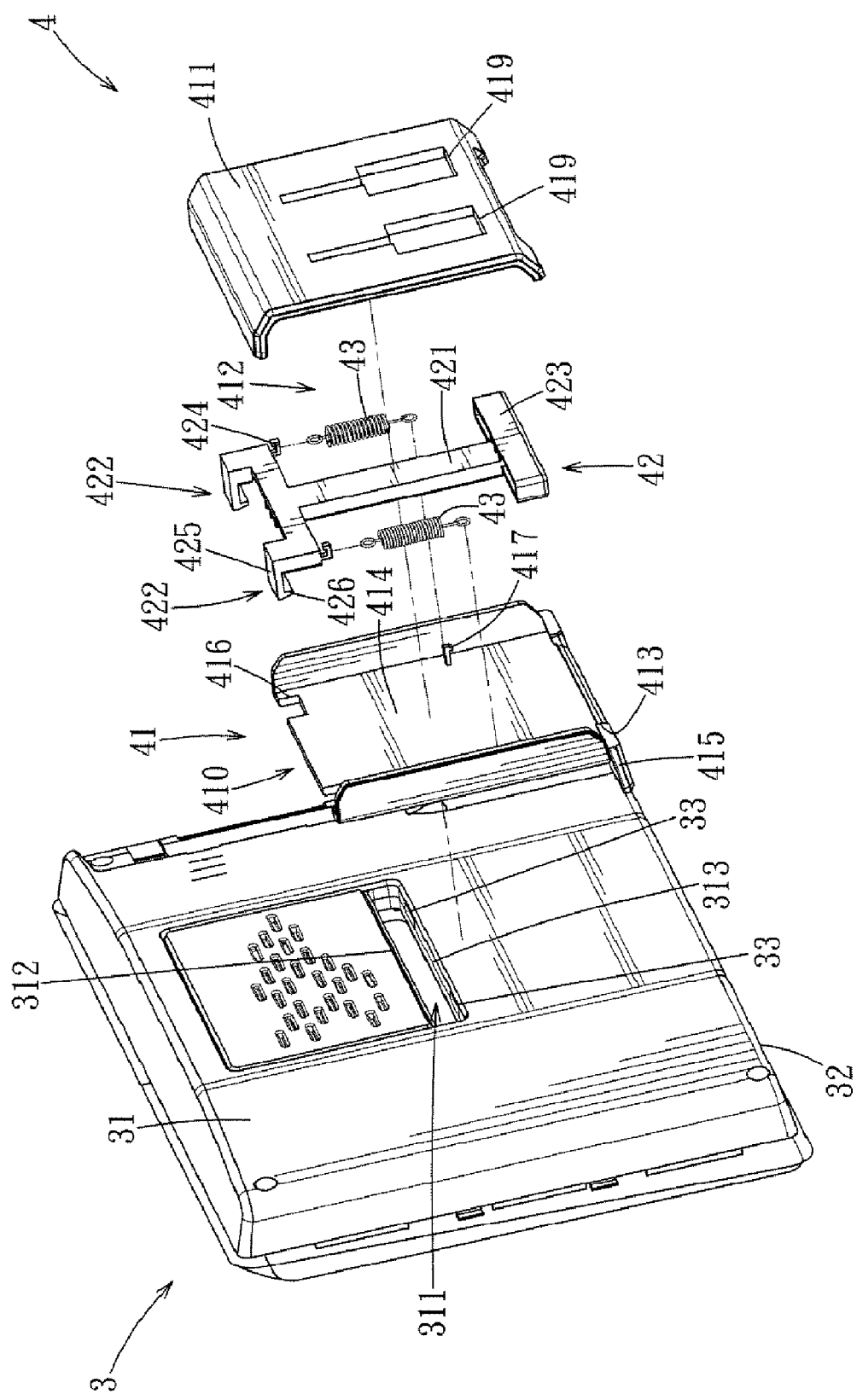
FIG. 4 is an exploded perspective view of the preferred embodiment to illustrate components of the holder and the assembly relationship between the holder and the electronic device.
Figure 5:
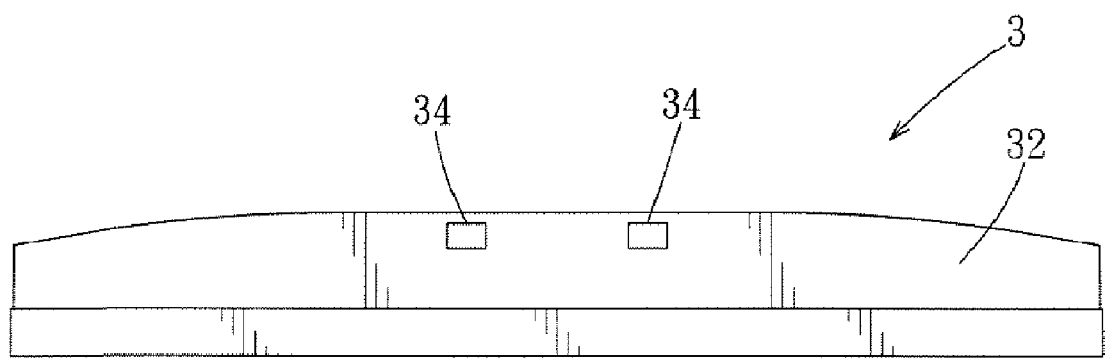
FIG. 5 is a bottom view of the electronic device of the preferred embodiment.
Figure 6:
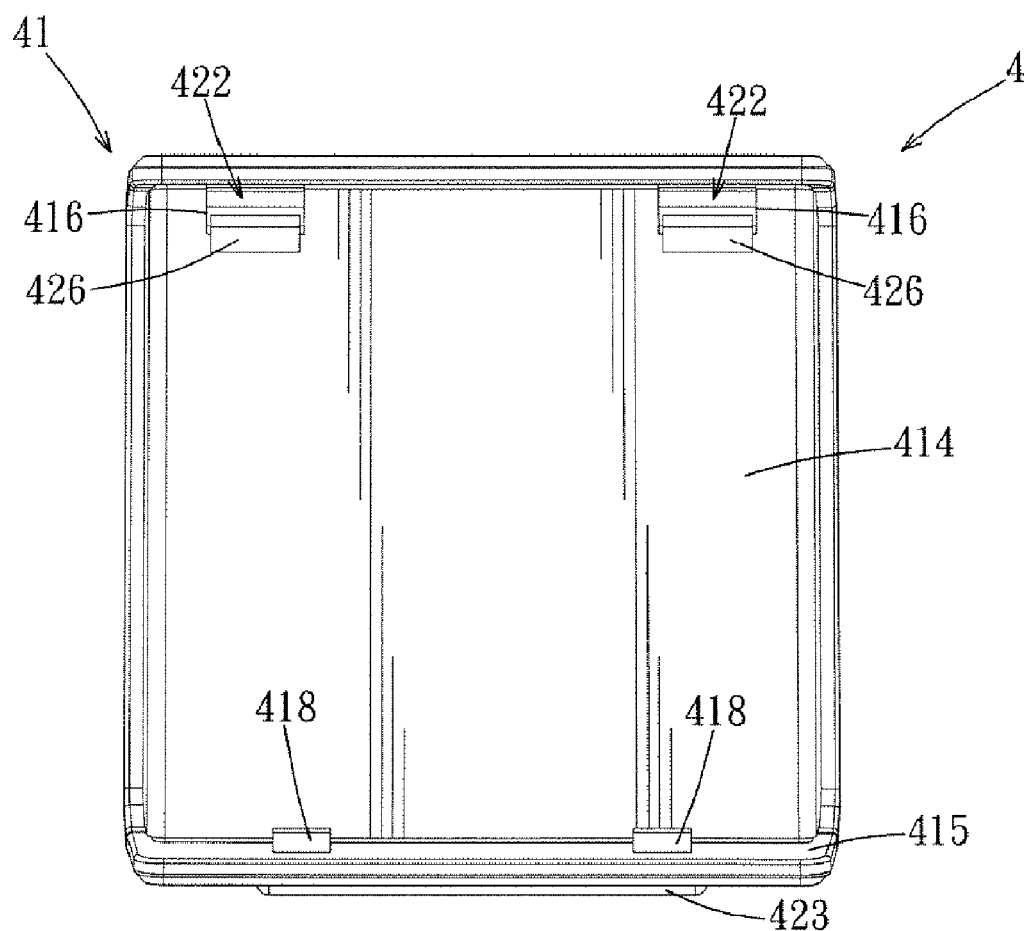
FIG. 6 is a front view of the holder of the preferred embodiment.
Figure 7:
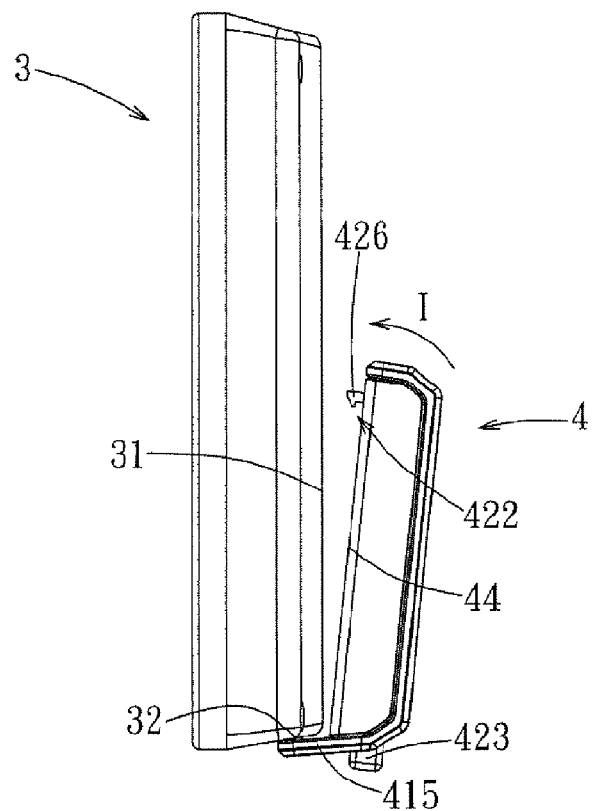
FIG. 7 is a schematic view illustrating how the holder is attached to the electronic device in the preferred embodiment.

The holder 4 includes a housing 41, a support frame 42, and two resilient elements 43. The housing 41 Includes a front cover 410 and a rear cover 411 coupled to a rear side of the front cover 410. The front cover 410 and the rear cover 411 cooperatively define a receiving space 412 for receiving the support frame 42 and the resilient elements 43, and a through hole 413 provided in a bottom end of the housing 41 to communicate spatially the receiving space 412 with the outside. The front cover 410 has a generally upright front plate 414, and a barrier plate 415 extending slantingly forward and downward from a bottom end of the front plate 414. The front plate 414 is disposed to abut against the rear face 31 of the electronic device 3. The front plate 414 has two openings 416 disposed adjacent to a top end thereof, and two first positioning hooks 417 (only one is shown in FIG. 4) disposed spacedly on an inner surface thereof and within the receiving space 412. The barrier plate 415 is disposed to abut against the bottom face 32 of the electronic device 3, and has two positioning members 418 for engaging the two positioning holes 34, respectively. The rear cover 411 has two spaced-apart retaining slots 419 respectively engaged with retaining blocks (not shown) on the support seat, whereby the holder 4 may be firmly secured on the support seat.

The support frame 42 includes a frame body 421, two catch members 422, a push button portion 423, and two second positioning hooks 424. The frame body 421 is a generally T-shaped upright structure. The two catch members 422 are disposed respectively at two opposite sides of a top end of the frame body 421. Each catch member 422 has an extension portion 425 extending forwardly from the top end of the frame body 421 and through a respective opening 416, and a hook portion 426 formed at a front end of the extension portion 425 and exposed from the front plate 414. Each hook portion 426 is engaged with a respective retaining hole 33 in the electronic device 3. The two second positioning hooks 424 are disposed respectively at two opposite sides of the frame body 421 and above the first positioning hooks 417. Each resilient element 43 is a compression spring having two ends that are respectively engaged with a respective first positioning hook 417 and a respective second positioning hook 424. Each resilient element 43 is disposed to provide the catch members 422 with a spring force needed thereby for restoration. The push button portion 423 is disposed at a bottom end of the frame body 421 and extends through the through hole 413 to be exposed from a bottom end of the housing 41 for manipulation by a user. Thus, the support frame 42 is movable relative to the housing 41.

As shown in FIGS. 4, 7, 8 and 9, when it is desired to assemble the holder 4 to the electronic device 3, first of all, the barrier plate 415 of the housing 41 is brought to abut against the bottom face 32 of the electronic device 3 such that the positioning members 418 (see FIG. 6) on the barrier plate 415 are respectively engaged with the positioning holes 34 (see FIG. 5) in the bottom face 32. Subsequently, the holder 4 is rotated in a direction indicated by the arrow (I) (see FIG. 7) such that the front plate 414 of the holder 4 abuts against the rear face 31 of the electronic device 3. When the catch members 422 of the support frame 42 extend respectively into the groove 311 and reach the respective retaining holes 33, due to the spring action of the resilient elements 43, the hook portions 426 of the catch members 422 are respectively retained in the retaining holes 33, thereby completing assembly of the holder 4 to the electronic device 3. Moreover, the holder 4 is in a locked state relative to the electronic device 3.

Figure 10:
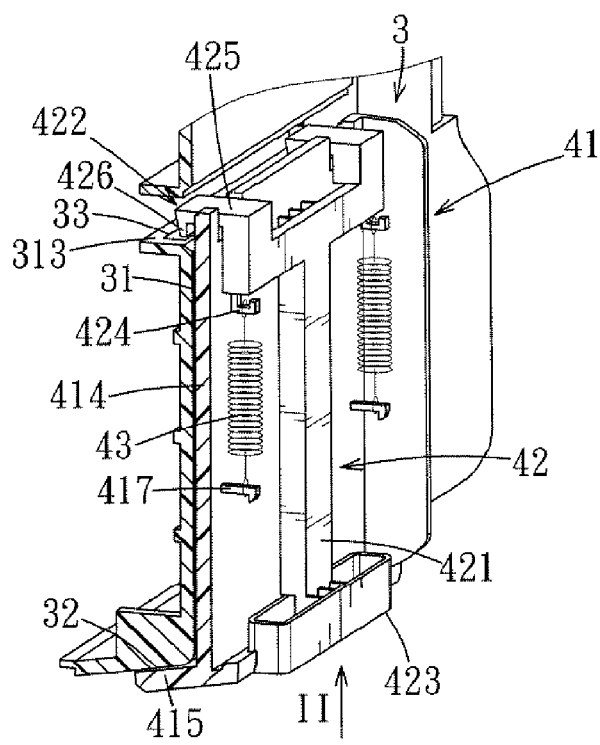
FIG. 10 is a fragmentary schematic sectional view of the preferred embodiment to illustrate how the catch members of the holder are disengaged from the retaining holes in the electronic device.

As shown in FIG. 10, when the user presses the push button portion 423 of the support frame 42 in a direction indicated by the arrow (II), the hook portions 426 of the catch members 422 will be brought to move upwardly. When the hook portions 426 are released from the retaining holes 33, the holder 4 is in an unlocked state relative to the electronic device 3. The user can then rotate the holder 4 in a direction opposite to that indicated by the arrow (I) (see FIG. 7), so that the front plate 414 of the holder 4 is moved away from the rear face 31 of the electronic device 3. The positioning members 418 (see FIG. 6) on the barrier plate 415 can be subsequently disengaged from the positioning holes 34 (see FIG. 5) in the electronic device 3 so as to permit detachment of the holder 4 from the electronic device 3.

Figure 1:
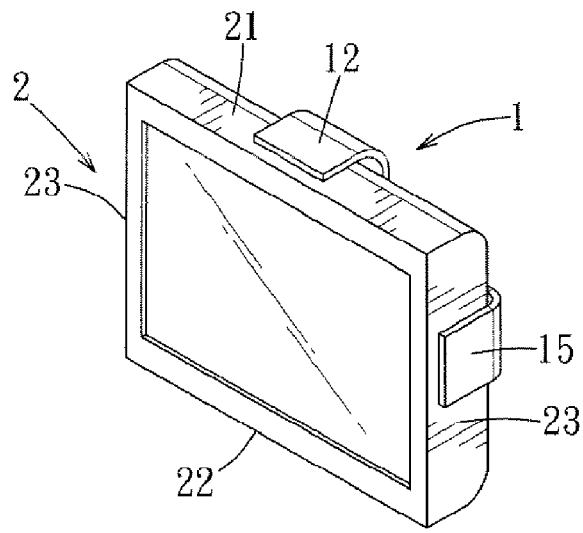
FIG. 1 is a perspective view of a conventional holder and an electronic device after assembly.
Figure 2:
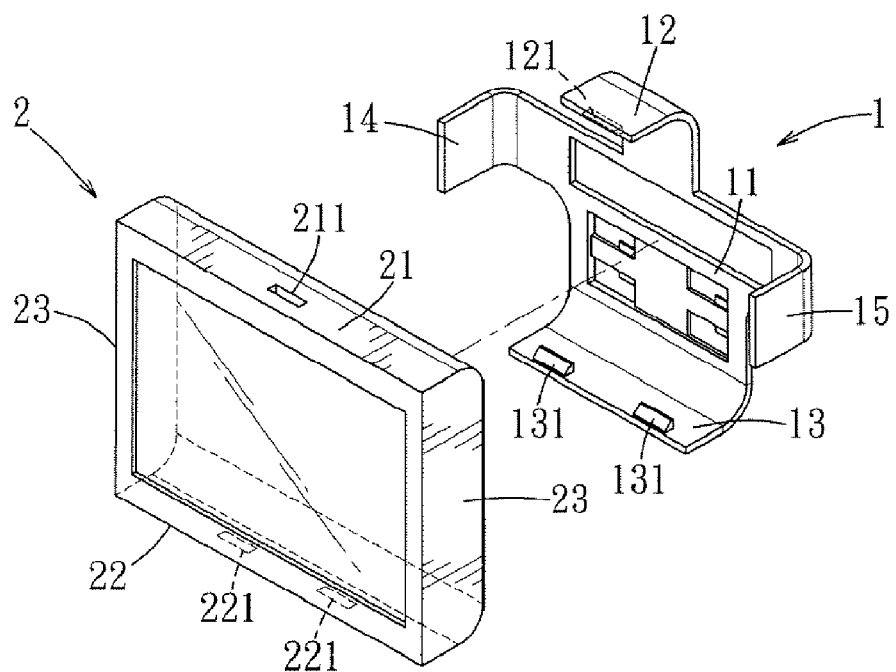
FIG. 2 is an exploded perspective view of FIG. 1.
Figure 8:
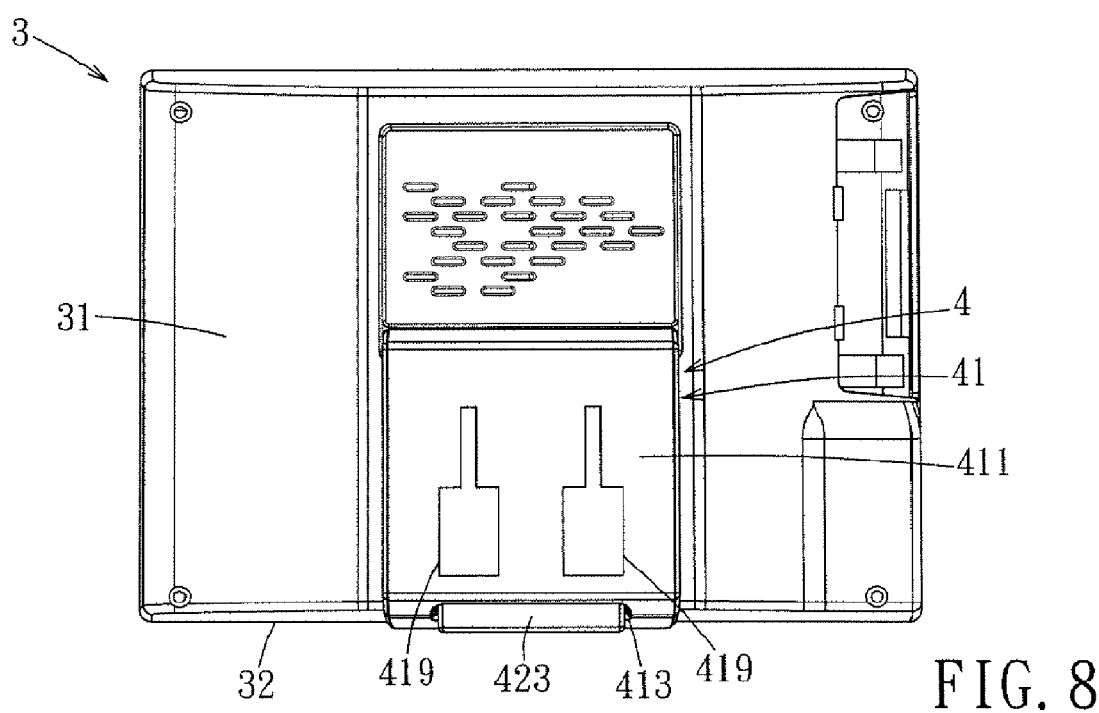
FIG. 8 is a rearview of the assembly of the preferred embodiment.
Figure 9:
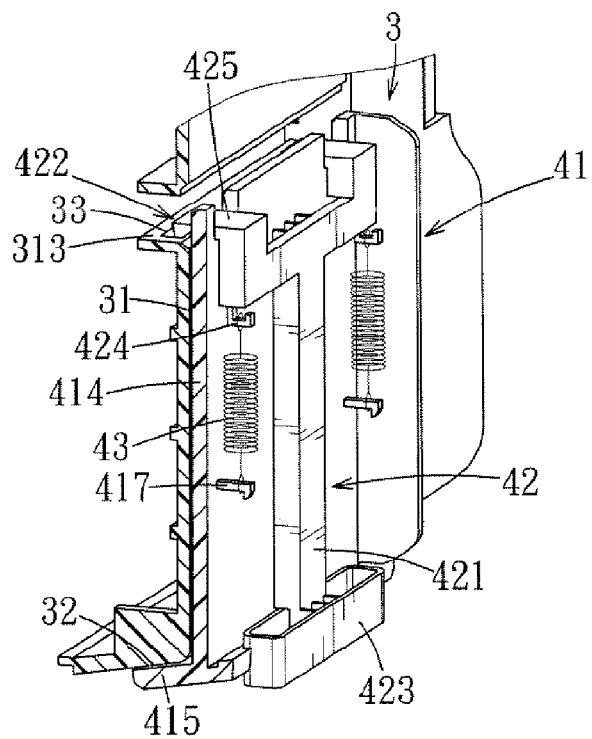
FIG. 9 is a fragmentary schematic sectional view of the preferred embodiment to illustrate how catch members of the holder engage retaining holes in the electronic device.

As shown in FIGS. 3, 4 and 8, since the holder 4 is assembled to the electronic device 3 by means of the positioning members 418 (see FIG. 6) and the catch members 422 that are respectively engaged with the positioning holes 34 (see FIG. 5) and the retaining holes 33 in the electronic device 3, compared with the prior art, such a manner of assembling will not result in rubbing of the holder 4 against outer peripheral surfaces of the electronic device 3, thereby preventing damage to the appearance of the electronic device 3 during the process of detachment. In addition, since the size of the holder 4 is smaller than that of the holder 1 (see FIG. 1) of the prior art, after the holder 4 is assembled to the rear face 31 of the electronic device 3, the electronic device 3 can hide the holder 4 from sight. Thus, the holder 4 will not affect the appearance of the electronic device 3 when the electronic device 3 is viewed from the front.

Figure 11:
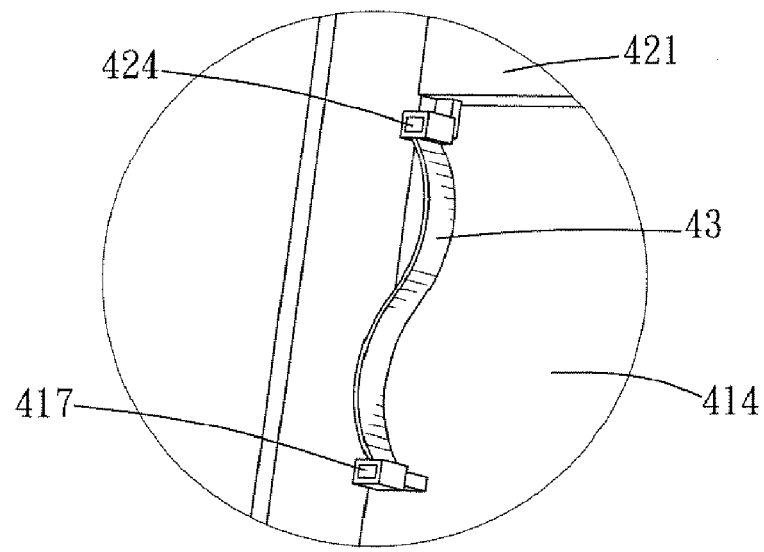
FIG. 11 is a partially enlarged view of the preferred embodiment, illustrating a resilient element in the form of a resilient plate.

It is particularly noted that, in this embodiment, each resilient element 43 may be a resilient plate (see FIG. 11) having two ends that are respectively retained on a respective first positioning hook 417 and a respective second positioning hook 424. The retaining holes 33 and the positioning holes 34 in the electronic device 3, and the openings 416, the positioning members 418, the catch members 422, and the resilient elements 43 of the holder 4 can all be designed to be one in number, without being limited to the disclosed embodiment, while still being capable of securing the holder 4 onto the electronic device 3.

Figure 12:
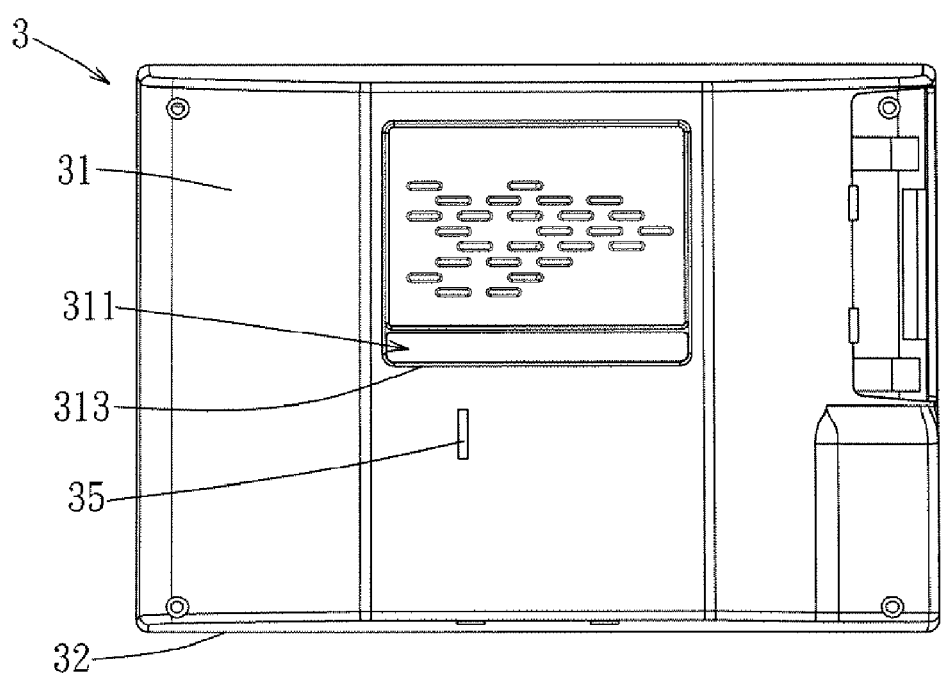
FIG. 12 is a rear view of the electronic device of the preferred embodiment.
Figure 13:
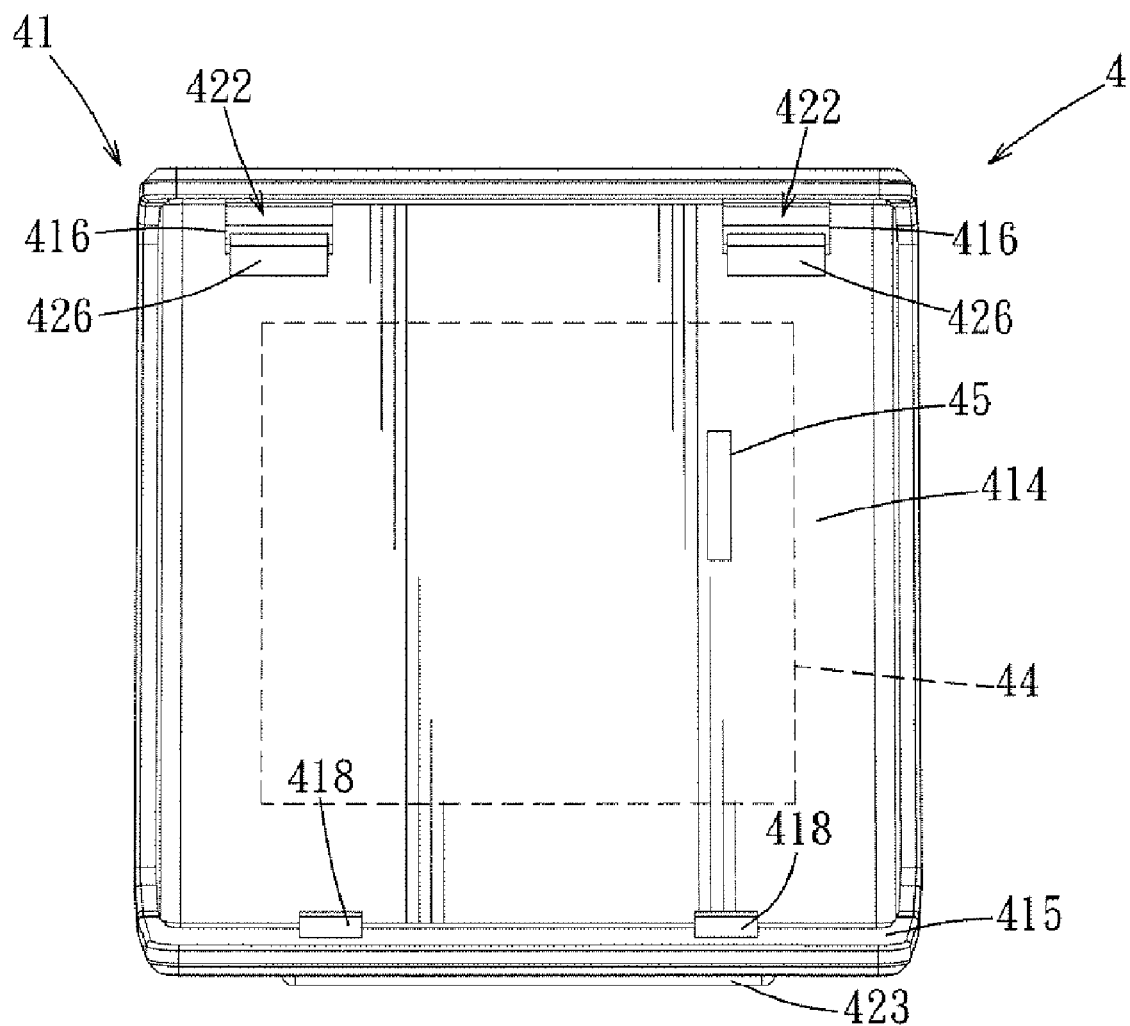
FIG. 13 is another front view of the holder of the preferred embodiment.

In addition, as shown in FIGS. 12 and 13, the electronic device 3 may be provided with a first electrical connector 35 on the rear face 31, and the holder 4 may be provided with a circuit board 44 disposed within the receiving space 412 (see FIG. 4) of the housing 41, and a second electrical connector 45 disposed on the front plate 414 of the housing 41 and electrically connected to the circuit board 44. The circuit board 44 may be a component of a power converting circuit, and may be electrically connected to an external power source through a power cable (not shown). Thus, after the holder 4 is assembled to the electronic device 3, the second electrical connector 45 will be electrically connected to the first electrical connector 35 and the circuit board 44, thereby enabling the holder 4 to serve as a charging cradle.

In sum, since the holder 4 according to the embodiment is assembled to the electronic device 3 by means of the positioning members 41S and the catch members 422 that are respectively retained in the positioning holes 34 and the retaining holes 33 in the electronic device 3, the holder 4 will not rub against the outer peripheral surfaces of the electronic device 3 during assembly, thereby avoiding damage to the appearance of the electronic device 3. In additions since the size of the holder 4 is small, after the holder 4 is assembled to the rear face 31 of the electronic device 3, the electronic device 3 can hide the holder 4 from sight. Therefore, the holder 4 will not affect the appearance of the electronic device 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements. In addition, it should be appreciated that the embodiment as described herein or any of the claims as appended hereto does not necessarily have to achieve all of the objects, advantages or features disclosed herein. Moreover, the title of the invention and the abstract of disclosure are provided herein to allow a searcher to quickly ascertain the subject matter of the technical disclosure of any patent issued on this application, and should not be relied upon to limit the scope of protection sought in this invention.

We claim:

1. A holder for holding an electronic device, the electronic device including a rear face and a retaining hole provided in the rear face, said holder comprising:
    a housing for disposition on the rear face of the electronic device, said housing having a receiving space and a barrier plate for abutting against one side of the electronic device;
    a support frame disposed in said receiving space and movable relative to said housing, said support frame including a catch member which is exposed from said housing, which is disposed opposite to said barrier plate, and which is for engaging the retaining hole, and a push button portion which is exposed from said housing, said push button portion being pressible to move said catch member away from the retaining hole so as to release engagement between said catch member and the retaining hole; and
    a resilient element disposed in said receiving space to provide said catch member with a restoring spring force.

2. The holder according to claim 1, wherein said housing further includes a front plate connected to said barrier plate and for abutting against the rear face of the electronic device, said front plate having an opening adjacent to a top end thereof, the retaining hole extending horizontally, said catch member extending through said opening and being engaged with the retaining hole.

3. The holder according to claim 2, the electronic device further including a positioning hole disposed in a bottom face thereof, wherein said barrier plate has a positioning member for engaging the positioning hole.

4. The holder according to claim 3, wherein said support frame further includes an upright frame body, said catch member having an extension portion extending forwardly from a top end of said frame body and through said opening, and a hook portion formed at a front end of said extension portion and for engaging the retaining hole.

5. The holder according to claim 4, wherein said housing further includes a through hole formed in a bottom end thereof, said push button portion being formed on a bottom end of said frame body and extending through said through hole.

6. The holder according to claim 5, wherein said front plate further has a first positioning hook disposed in said receiving space, said support frame further including a second positioning hook disposed on said frame body and above said first positioning hook, said resilient element being a resilient plate having two ends that are respectively secured to said first and second positioning hooks.

7. The holder according to claim 6, wherein the electronic device further includes a first electrical connector disposed on the rear face, said holder further comprising a circuit board disposed in said receiving space, and a second electrical connector disposed on said housing and electrically connected to the first electrical connector and said circuit board.

8. The holder according to claim 5, wherein said front plate further has a first positioning hook disposed in said receiving space, said support frame further including a second positioning hook disposed on said frame body and above said first positioning hook, said resilient element being a spring having two ends that are respectively secured to said first and second positioning hooks.

9. The holder according to claim 8, the electronic device further including a first electrical connector disposed on the rear face, wherein said holder further comprises a circuit board disposed in said receiving space, and a second electrical connector disposed on said housing for electrically interconnecting the first electrical connector and said circuit board.

10. The holder according to claim 1, the electronic device further including a positioning hole disposed in a bottom face thereof, wherein said barrier plate has a positioning member for engaging the positioning hole.

11. The holder according to claim, the electronic device further including a first electrical connector disposed on the rear face, wherein said holder further comprises a circuit board disposed in said receiving space, and a second electrical connector disposed on said housing for electrically interconnecting the first electrical connector and said circuit board.

12. A holder for holding an electronic device, the electronic device including a rear face, and two retaining holes disposed in the rear face and spaced apart from each other horizontally, said holder comprising:
   a housing for disposition on the rear face of the electronic device, said housing having a receiving space and a barrier plate for abutting against one side of the electronic device;
   a support frame disposed in said receiving space and movable relative to said housing, said support frame including two catch members which are exposed from said housing, which are disposed opposite to said barrier plate, and which are for engaging the two retaining holes, respectively, and a push button portion exposed from said housing, said push button portion being pressible to move said two catch members away from the two retaining holes, respectively, so as to release engagement between each of said catch members and the respective one of the retaining holes; and
   two resilient elements disposed in said receiving space to provide said two catch members with a restoring spring force.

13. An assembly of a holder and an electronic device, comprising:
   an electronic device including a rear face and a retaining hole disposed in said rear face;
   a holder for holding said electronic device, said holder including:
      a housing disposed on said rear face of said electronic device, said housing having a receiving space and a barrier plate for abutting against one side of said electronic device;
      a support frame disposed in said receiving space and movable relative to said housing, said support frame including a catch member which is exposed from said housing, which is disposed opposite to said barrier plate, and which is engaged with said retaining hole, and a push button portion which is exposed from said housing, said push button portion being pressible to move said catch member away from said retaining hole so as to release engagement between said catch member and said retaining hole; and
      a resilient element disposed in said receiving space to provide said catch member with a restoring spring force.

14. The assembly of a holder and an electronic device according to claim 13, wherein said housing further includes a front plate connected to said barrier plate and abutting against said rear face of said electronic device, said front plate having an opening disposed adjacent to a top end thereof, said retaining hole extending horizontally, said catch member extending through said opening and being engaged with said retaining hole.

15. The assembly of a holder and an electronic device according to claim 14, wherein said electronic device further includes a positioning hole disposed in a bottom face thereof, said barrier plate having a positioning member engaging said positioning hole.

16. The assembly of a holder and an electronic device according to claim 15, wherein said support frame further includes an upright frame body, said catch member having an extension portion extending forwardly from a top end of said frame body and through said opening, and a hook portion formed at a front end of said extension portion and engaged with said retaining hole.

17. The assembly of a holder and an electronic device according to claim 16, wherein said housing further includes a through hole formed in a bottom end thereof, said push button portion being formed on a bottom end of said frame body and extending through said through hole.

18. The assembly of a holder and an electronic device according to claim 17, wherein said front plate further has a first positioning hook disposed in said receiving space, said support frame further including a second positioning hook disposed on said frame body and above said first positioning hook, said resilient element being a compression spring having two ends that are respectively secured to said first and second positioning hooks.

19. The assembly of a holder and an electronic device according to claim 18, wherein said electronic device further includes a first electrical connector disposed on said rear face, said holder further comprising a circuit board disposed in said receiving space, and a second electrical connector disposed on said housing for electrically interconnecting said first electrical connector and said circuit board.

20. The assembly of a holder and an electronic device according to claim 17, wherein said front plate further has a first positioning hook disposed in said receiving space, said support frame further including a second positioning hook disposed on said frame body and above said first positioning hook, said resilient element being a resilient plate having two ends that are respectively secured to said first and second positioning hooks.

21. The assembly of a holder and an electronic device according to claim 20, wherein said electronic device further includes a first electrical connector disposed on said rear face, said holder further comprising a circuit board disposed in said receiving space, and a second electrical connector disposed on said housing for interconnecting electrically said first electrical connector and said circuit board.

22. The assembly of a holder and an electronic device according to claim 13, wherein said electronic device further includes a first electrical connector disposed on said rear face, said holder further comprising a circuit board disposed in said receiving space, and a second electrical connector disposed on said housing for electrically interconnecting said first electrical connector and said circuit board.

* * * * *